Aug. 25, 1964            K. N. THOMPSON           3,145,561
APPARATUS FOR DETERMINATION AND CONTROL
OF VOLATILITY OF A LIQUID
Filed Aug. 7, 1961                                      4 Sheets-Sheet 1

INVENTOR.
KEVIN N. THOMPSON
BY

INVENTOR.
KEVIN N. THOMPSON
BY

United States Patent Office 3,145,561
Patented Aug. 25, 1964

3,145,561
APPARATUS FOR DETERMINATION AND CONTROL OF VOLATILITY OF A LIQUID
Kevin N. Thompson, Whitestone, N.Y., assignor to Socony Mobil Oil Company, Inc., a corporation of New York
Filed Aug. 7, 1961, Ser. No. 129,664
3 Claims. (Cl. 73—53)

Control of the volatility of various materials, and particularly of hydrocarbon products such as gasoline is of considerable economic importance. For example, a gasoline, otherwise satisfactory, which is too volatile, may give rise to "vapor-lock" in an automotive carburetor, in other words, formation of vapor in the carburetion system prevents the proper feeding of liquid fuel through the carburetor.

This invention is directed to a method and to apparatus for effecting control of the volatility of such products during their manufacture.

Referring to gasoline for motor fuel use as an example of such products, a step in the preparation of gasoline is "stabilization" or "stripping" wherein the gasoline is passed through a distillation operation to remove from it any dissolved normally gaseous hydrocarbons and enough of the more volatile constituents to arrive at the desired volatility.

This invention is based upon the fact that a volatile liquid, in a closed chamber, in the absence of other materials, and at a given temperature and given pressure, will evaporate until an equilibrium exists, at which the relative volumes of vapor and liquid are a measure of the volatility of the liquid at the selected conditions.

The utilization of this fact in the present invention will be more clearly understood by reference to the drawings which are attached hereto and made a part hereof, as follows.

Figure 1:
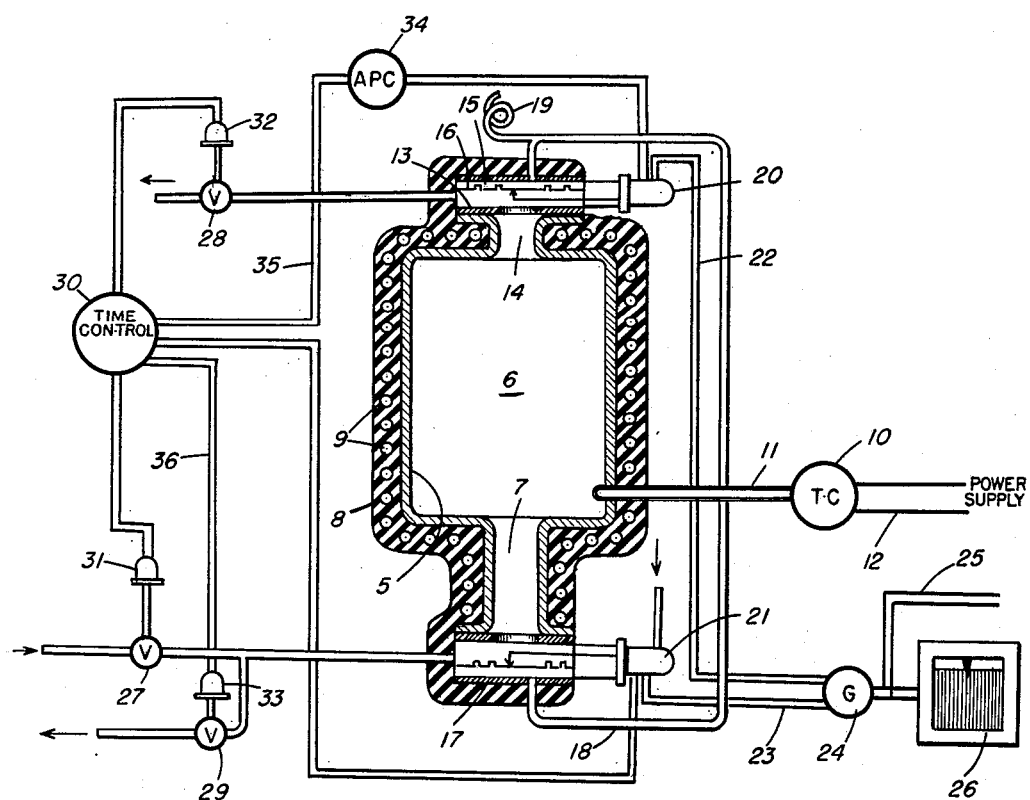
FIGURE 1 shows a basic form of apparatus for determining the ratio of vapor and liquid volumes and generating a signal proportional thereto.

In FIGURE 1, which is largely diagrammatic, 5 is a closed vessel, having an upper enlarged vapor space 6 and a lower, somewhat constricted liquid space 7. Vessel 5 is encased in insulating material 8 in which is embedded a heating coil 9. The temperature of the vessel is observed and controlled by instrument 10 operating to observe through thermocouple connection 11 and control through power supply 12.

At the upper end of vessel 5 there is mounted a pressure sensing element consisting of a casing 13 separated into two chambers, 14, and 15, by diaphragm 16. Space 14 is in open communication with the interior of vessel 5. A similar, and matched, pressure sensing element 17 is mounted at the bottom end of vessel 5 to sense the pressure at that point. A capillary tube 18 connects the spaces behind the diaphragms in the two sensing elements, and these spaces are evacuated therethrough, using "pigtail" 19, which is then sealed off. Thus, with equal pressures behind the diaphragms, these matched instruments are capable of reporting, through their operating capsules 20 and 21, and pressure transmission lines 22 and 23, both the absolute pressure and any pressure differential existing between the top and bottom of vessel 5 to instrument 24, where the pressure differential is converted into a signal proportional to said differential, which may be imposed on conductor 25 and/or recorded by recorder 26. Operating capsules 20 are not only capable of reporting conditions, but are equipped, in known manner, to exercise control functions, if desired.

Vessel 5 is further equipped with a gasoline inlet 27, a vent and overflow 28, and a drain 29.

Operation of this volatility measuring device is controlled by a cyclic timer device 30.

In operation, a cycle is initiated by timer 30, opening gasoline inlet 27, through control valve 31, opening vent 28 through control valve 32, and closing drain 29 through control valve 33. Gasoline (selected as a typical liquid product for purposes of this discussion) flows into vessel 5 after preheating (in a device not shown) to a temperature just below that at which vessel 5 is being operated, flows in to fill the vessel and overflow at 28, thus flushing the vessel of any vapor from a previous operation. After a time sufficient for this, timer 30 operates to close inlet 27 and overflow 28.

With temperature control 10 holding the vessel 5 at the desired test temperature, a pressure controller 34, utilizing the "absolute" pressure sensed by 20 at the top of the vessel 5 and connected through conductor 35, timer control 30 and conductor 36 to drain valve 29 acts to arrive at and maintain the desired pressure within the vessel by draining liquid as vapor is formed until an equilibrium condition at the desired temperature and pressure has been reached. At that time there will be vapor, at the desired test pressure, in chamber 6, and a column of liquid in chamber 7. There will be a pressure upon the diaphragm in pressure sensing element 17, at the bottom, composed of the sum of the pressure existing in chamber 6 and the hydrostatic head of the liquid in chamber 7. This pressure at 17 will be higher than the pressure at the top, and this differential will be proportional to the ratio of vapor/liquid volumes and so proportional to the volatility of the sample at the selected temperature and pressure.

Typical conditions for ascertaining the volatility of motor gasoline in order to arrive at control of vapor-locking tendencies will be temperatures in the range 100–150° F. and atmospheric pressure.

Figure 2:
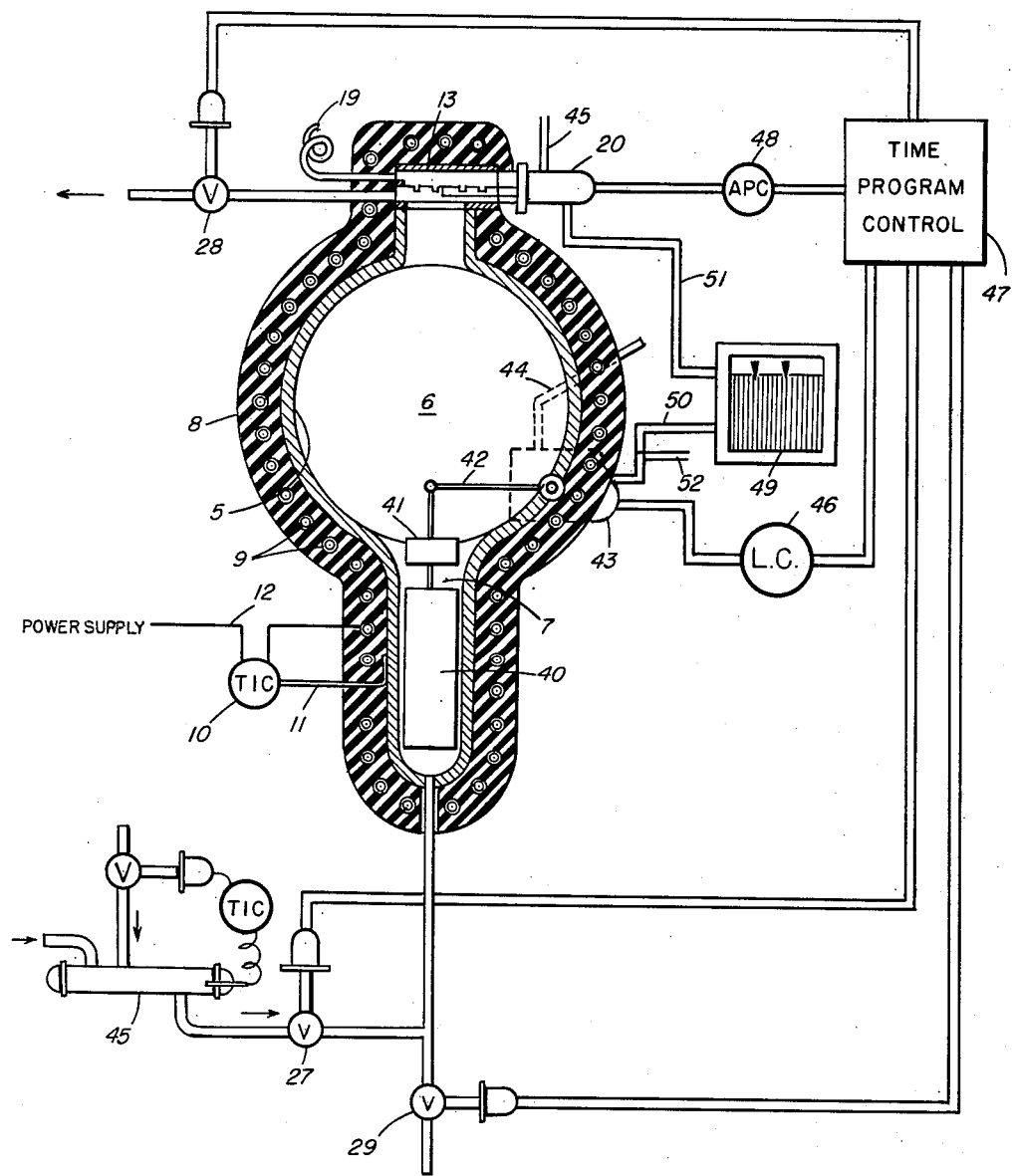
FIGURE 2 shows a modification of the apparatus of FIGURE 1.

FIGURE 2, still largely diagrammatic, shows a modified form of the apparatus for determining relative volumes of vapor and liquid. As before, with like parts bearing like numbers, there are shown vessel 5, chamber 6, chamber 7, insulation 8, heating coil 9, temperature control 10, thermocouple connection 11 and power supply 12. Also used are liquid supply 27, vent and overflow 28 and drain 29. At the top of chamber 6, there is a pressure sensing element 13, as before, open to chamber 6, but in this embodiment the space back of the diaphragm is evacuated through "pigtail" 19 without communication with any second pressure sensing element. Instead of the pressure sensing element at the bottom of chamber 7 in FIGURE 1, there is used here a displacement float, composed of bodies 40 and 41, mounted in chamber 5 and acting through lever arm 42 on level transmitter and control instrument 43.

The operation detail with the apparatus of FIGURE 2 is somewhat different than that of FIGURE 1.

In FIGURE 2, timer control 47 acts to open liquid supply 27 and vent and overflow 28 while holding drain 29 closed. Liquid, heated in 45 to a temperature a bit below test temperature, flows into vessel 5 to fill it, overflow at 28, and flush vapors from a preceding operation. It will be assumed that gasoline is being tested for volatility at some specified temperature and at atmospheric pressure. It will also be assumed that controls actuated by air pressure are being used, although those who are skilled in instrumentation will readily understand that controls actuated by other media can be similarly utilized.

Liquid level control and transmitter 43 is supplied with

"instrument" air at a pressure of 18–20 p.s.i.g. through connection 44 and control and sensing capsule 20 is similarly supplied through connection 45. A snap acting relay 46 is set to close at pressures below 16 p.s.i.g.

With the closed vessel 5 drained, control air passing from 43 through 46 enables timer 47 to open inlet 27 and vent-outlet 28 while closing drain 29. The vessel fills until back pressure caused by restricted flow of liquid through vent-outlet 28 builds up a back pressure of 5 p.s.i.g., which, sensed by sense-control capsule 20 acts through pressure control 48 and timer 47 to close inlet 27 and vent-outlet 28 and open drain 29. Now the level of liquid falls until upper float 41 is exposed, at which time level control transmitter 42 cuts the supply of control air to below 16 p.s.i.g., causing 46 to snap closed, cutting off control of timer operation 47 through this agency. Pressure control 48 is thus solely in control of timer 47, and being set for 5 p.s.i.g. and 0 p.s.i.g. (14.7 p.s.i.a.) permits adjustment to 0 p.s.i.g. in the vessel 5, by appropriate drain through 29, while vapor forms as liquid rises to equilibrium temperature, after which 29 is closed. Now there is a liquid level measured by the immersion of float 40, the level of which is reported to chart 49 through connection 50. Since the volume of vessel 5 is known, this signal, reporting ratio of vapor to liquid, is calibrated to volatility. A check on the pressure in vessel 5 is also reported to chart 49 from capsule 20 through connection 51.

Since the magnitude of the signal through 50 is proportional to the volatility, it is also diverted for control purposes by connection 52.

Figure 3:
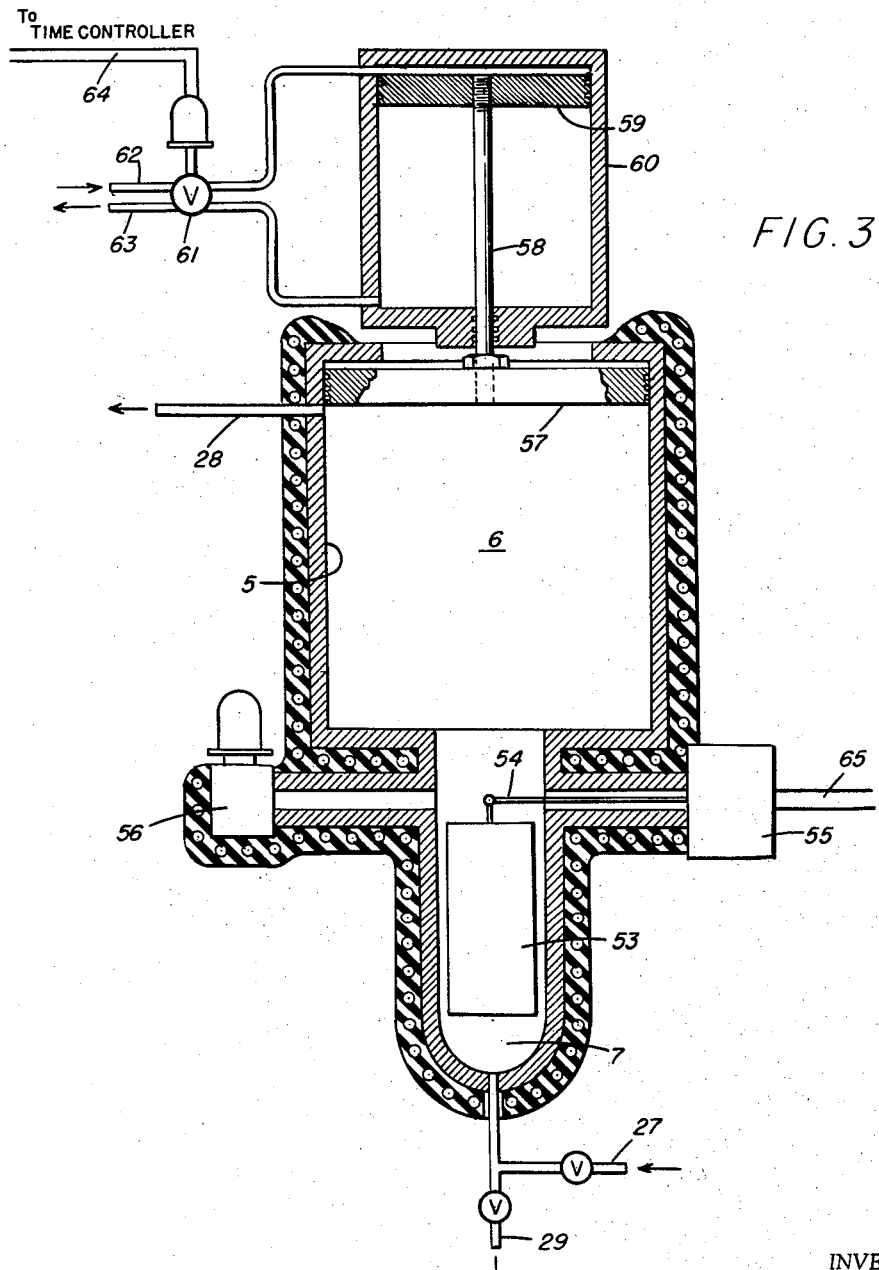
FIGURE 3 shows a second modification.

It is quite possible that a minor fault of devices such as those of FIGURES 1 and 2 may intrude where extremely delicate control is required. As the chamber 6 drains, its walls remain wetted with the liquid. Since the draining operation is quite rapid, an unvaporized portion of liquid remaining on the walls, however small, does not join the liquid measured in 7, but is vaporized, forming more than an "equilibrium" vapor-liquid ratio. The device of FIGURE 3 is designed both to avoid this, and to permit obtaining quicker volatility readings.

In FIGURE 3, again diagrammatic, there is shown vessel 5, chambers 6 and 7 with inlet 27, vent-overflow 28, and drain 29. There is a float 53 in chamber 7, connected by 54 to level controller-transmitter 55. An absolute pressure transmitter controller 56 is also supplied. Since the timer control, and also control connections for items 27, 28, 29, etc., are in general quite similar to those of FIGURES 1 and 2, and are well known in the art, they are omitted in this figure. The vessel 5 is also insulated and temperature controlled as before.

Chamber 6 is now cylindrical and flat bottomed, and provided with a piston 57 connected by shaft 58 to piston 59 in actuating cylinder 60, to be operated by control valve 61, supplied with air through 62 and exhausted through 63, being positioned by signal from program timer control coming through connection 64.

At the beginning of the time cycle, with piston 57 at the top of chamber 6, inlet 27 and vent-outlet 28 open, drain 29 closed, the vessel is filled to overflowing. Then, inlet 27 and vent outlet 28 are closed, drain 29 opened, and piston 57 is forced down to bottom position, freeing chamber 6 of liquid and wiping the walls thereof. Drain 29 is now closed and piston 57 raised to the up position. All of these are effected by simple time controls. Now liquid evaporates to fill chamber 6 and absolute pressure transmitter-controller 56 takes over, adjusting, by pressure sensing, the drain 29 until vapor-liquid equilibrium is effected at the desired temperature and pressure. Level-controller transmitter 55 now will show, through the position of float 53, the ratio of vapor volume to liquid volume, as a measure of volatility, and a signal, proportional thereto will be transmitted for control and recording purposes through conductor 65.

Figure 4:
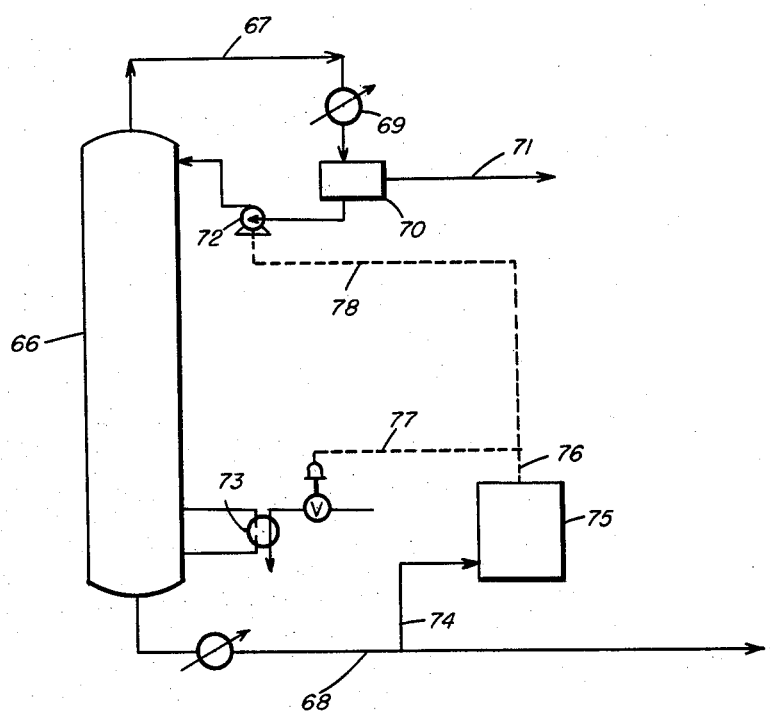
FIGURE 4 shows the application of the signal to the actual control of volatility of a distillate product.

Turning to FIGURE 4, the control signal, proportional to the volatility, may be used in any of several ways to control the equipment from which the sampled product is produced. In FIGURE 4, a stabilizer used to remove light or low boiling (volatile) material from gasoline is shown at 66. Light material passes overhead at 67, and product leaves at 68. Light material is condensed and cooled in 69 and collected in 70, to be removed at 71. A portion of this condensate in 70 is returned to the top of the stabilizer as reflux by pump 72. Heat is supplied to the stabilizer bottom by reboiler 73.

A sample, removed from product line 68 by connection 74 is analyzed in volatility analyzer 75 and a signal impulse proportional to the volatility is produced in conductor 76. This may be utilized in either of two ways. In the first, with reflux quantity and temperature of reflux constant by means of pump 72 and condenser-cooler 69, the signal may be utilized at 77 to change the temperature of the stabilizer bottom, giving less heat for greater than desired volatility, or the reverse. In the second, with reboiler temperature constant, the signal may be utilized at 78 to control pump 72, increasing reflux for too great volatility, or the reverse.

It will be appreciated by those skilled in the art of instrumentation and control that many of the instruments for sensing and control which are not described in detail herein are types commonly available and utilized in the art, and also that equivalent controls and timing mechanism other than those described may be used.

I claim:

1. Apparatus for determining the volatility of a liquid at preselected temperature and pressure comprising a closed chamber, means for introducing a sample portion of the liquid to be examined into said chamber, means to subject the sample in said chamber to a preselected temperature, means to subject the sample in said chamber to a preselected pressure, means to sense the ratio of vapor volume to liquid volume in said chamber at said preselected conditions, and means to generate a signal proportional to said ratio.

2. Apparatus for determining the volatility of a liquid at preselected temperature and pressure comprising a closed chamber, means for introducing a sample portion of the liquid to be examined into said chamber, means to subject the sample in said chamber to a preselected temperature, means to subject the sample in said chamber to a preselected pressure, means to sense the ratio of vapor volume to liquid volume in said chamber at said preselected conditions, means to generate a signal proportional to said ratio, and metering means to show the magnitude of said signal.

3. Apparatus for use in the control of the volatility of a liquid distillate product comprising a closed chamber, means for introducing a sample portion of the liquid product of said distillation into said chamber, means to subject the sample in said chamber to a preselected temperature, means to subject the sample in said chamber to a preselected pressure, means to sense the ratio of vapor volume to liquid volume in said chamber at said preselected conditions, and means to generate a control signal proportional to said ratio.

References Cited in the file of this patent
UNITED STATES PATENTS

| 2,086,808 | Kallam | July 13, 1937 |
|---|---|---|
| 2,119,786 | Kallam | June 7, 1938 |
| 2,643,216 | Findlay | June 23, 1953 |